(12) United States Patent
Davidian

(10) Patent No.: US 12,546,533 B2
(45) Date of Patent: Feb. 10, 2026

(54) DEVICE FOR SEPARATING AIR BY CRYOGENIC DISTILLATION

(71) Applicant: L'Air Liquide, Societe Anonyme pour l'Etude et l'Exploitation des Procedes Georges Claude, Paris (FR)

(72) Inventor: Benoit Davidian, Champigny sur Marne (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 213 days.

(21) Appl. No.: 18/265,027

(22) PCT Filed: Dec. 2, 2021

(86) PCT No.: PCT/EP2021/084002
§ 371 (c)(1),
(2) Date: Jun. 2, 2023

(87) PCT Pub. No.: WO2022/117741
PCT Pub. Date: Jun. 9, 2022

(65) Prior Publication Data
US 2024/0011704 A1   Jan. 11, 2024

(30) Foreign Application Priority Data
Dec. 2, 2020  (FR) ...................... 2012564

(51) Int. Cl.
*F25J 3/04*  (2006.01)
(52) U.S. Cl.
CPC ....... *F25J 3/04157* (2013.01); *F25J 3/04339* (2013.01)

(58) Field of Classification Search
CPC .. F25J 3/04157; F25J 3/04339; F25J 3/04351; F25J 3/044; F25J 3/0489
See application file for complete search history.

(56) References Cited

U.S. PATENT DOCUMENTS

| 2,625,237 A | 1/1953 | Gribler et al. |
| 5,461,871 A | 10/1995 | Bracque et al. |

(Continued)

FOREIGN PATENT DOCUMENTS

| AU | 2011 101 525 | 1/2012 |
| EP | 0 629 829 | 12/1994 |

(Continued)

OTHER PUBLICATIONS

International Search Report and Written Report for PCT/EP2021/084002, mailed Mar. 25, 2022.

(Continued)

*Primary Examiner* — Joel M Attey
*Assistant Examiner* — Ibrahim A. Michael Adeniji
(74) *Attorney, Agent, or Firm* — Justin K. Murray

(57) ABSTRACT

A device for separating air by cryogenic distillation, comprising a first module containing a main air compressor, a second module, a third module containing a purification unit, a fourth module containing a heat exchanger and a system of columns comprising at least one distillation column that is or is not contained in the fifth module, the second module containing a connection for connecting the compressor of the first module to the purification unit of the third module in order to send compressed air from the compressor to the purification unit and also containing a connection for connecting the purification unit to the heat exchanger of the fourth module in order to send purified air in the purification unit to the heat exchanger.

19 Claims, 3 Drawing Sheets

(56) References Cited

U.S. PATENT DOCUMENTS

| | | | | |
|---|---|---|---|---|
| 2003/0089126 | A1* | 5/2003 | Stringer | F25J 3/04303 62/643 |
| 2004/0000166 | A1* | 1/2004 | Moeller | F25J 3/0489 62/643 |
| 2006/0144684 | A1* | 7/2006 | Gibbon | F25J 3/04945 202/133 |
| 2006/0260357 | A1* | 11/2006 | Gibbon | F25J 3/0489 62/643 |
| 2013/0283855 | A1* | 10/2013 | Rampp | F25J 1/0012 62/643 |
| 2015/0096327 | A1* | 4/2015 | Lochner | F25J 3/04678 62/643 |
| 2017/0009940 | A1* | 1/2017 | Cavagne | F17C 13/001 |
| 2019/0137174 | A1* | 5/2019 | Cavagne | F25J 3/04969 |
| 2021/0372116 | A1* | 12/2021 | Hillenburg | F25J 3/0489 |

FOREIGN PATENT DOCUMENTS

| | | | |
|---|---|---|---|
| EP | 2 657 633 | 10/2013 | |
| FR | 3 017 939 | 8/2015 | |
| FR | 3017939 A1 * | 8/2015 | ............ F25J 3/0489 |
| FR | 3 059 087 | 5/2018 | |
| FR | 3121744 A3 * | 10/2022 | |
| JP | 2020 069 471 | 5/2020 | |

OTHER PUBLICATIONS

"GFED Series: Oxygen and Nitrogen Generating Systems," URL:http://www.cosmodyne.com/Frostbyte/cosmodyne_GFED-Series.pdf, Jul. 26, 2013, pp. 1-4.

"Skid-Mounted Oxygen-Nitrogen Plant Type SKI45," Publication BOC Cryoplants, BOC Cryoplants Engineering Centre, Guildford, GB, Sep. 1, 1991, pp. 1-03.

* cited by examiner

[FIG.1]
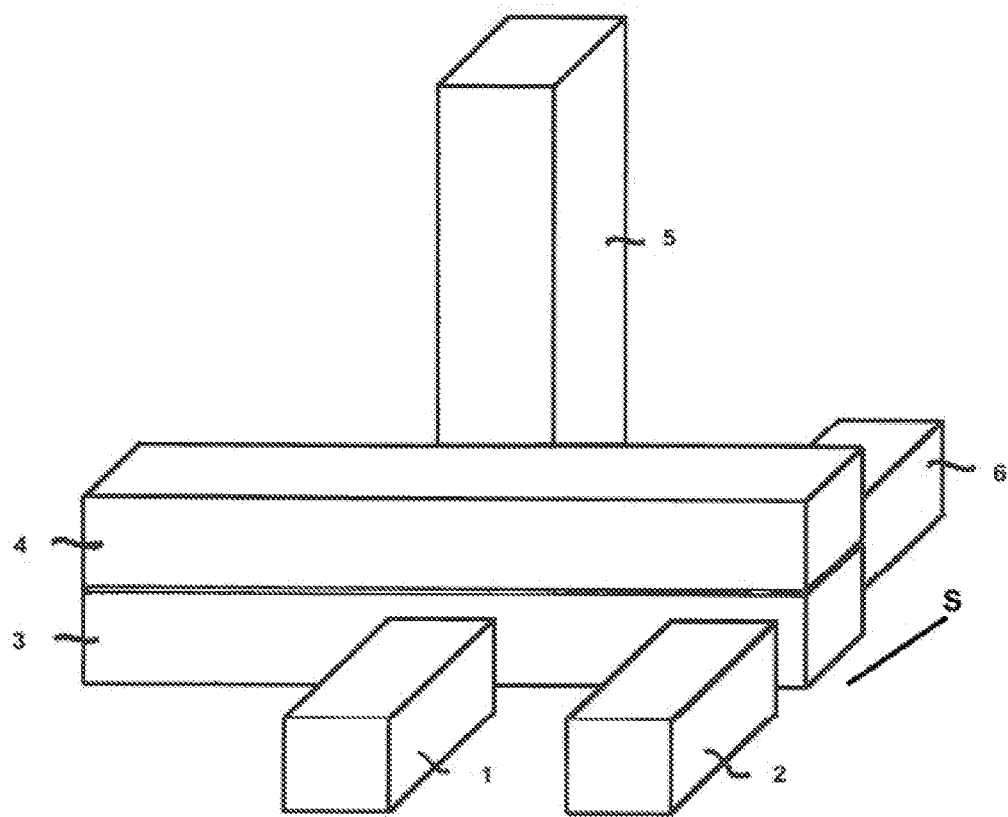

[FIG. 2]
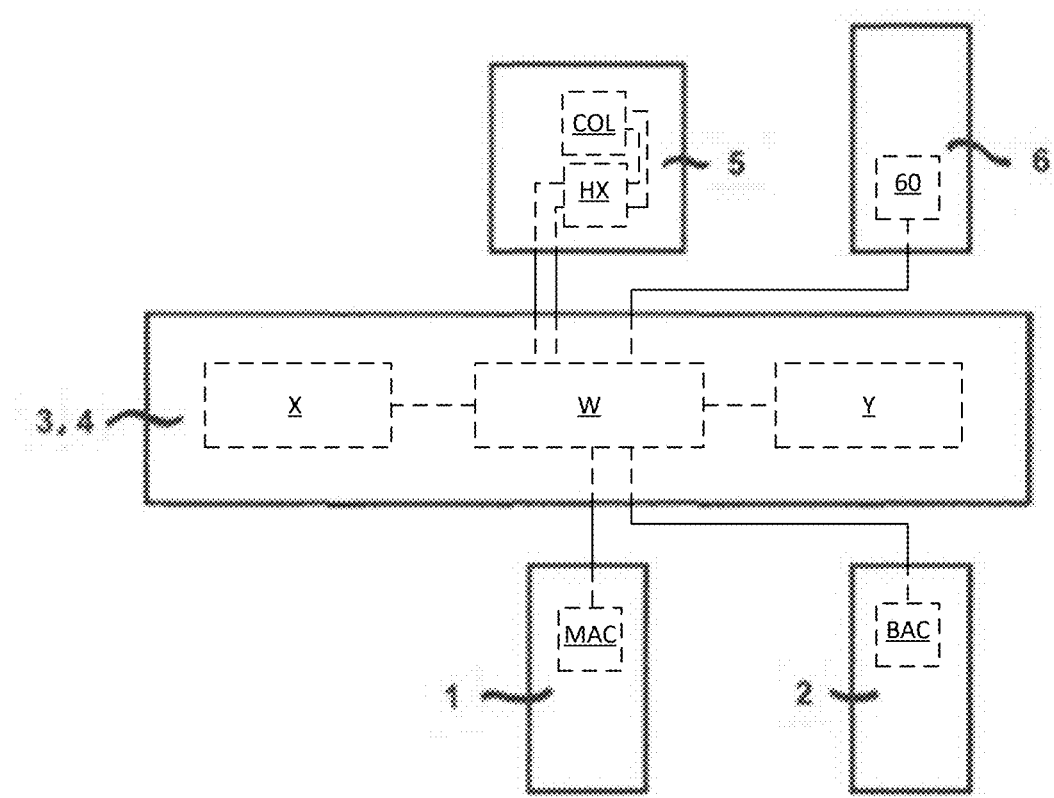

[FIG.3]
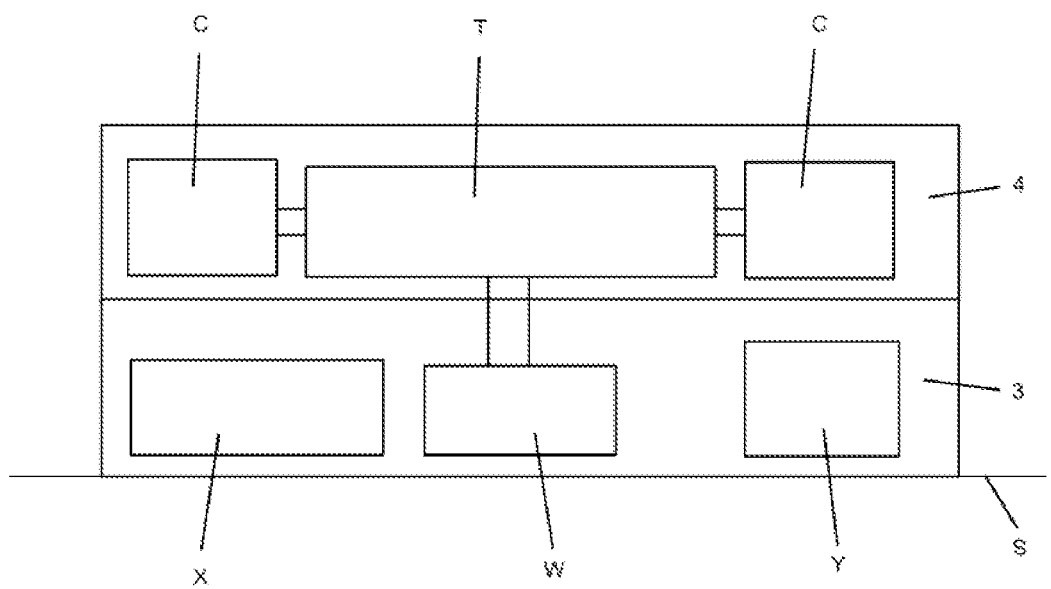

DEVICE FOR SEPARATING AIR BY CRYOGENIC DISTILLATION

CROSS REFERENCE TO RELATED APPLICATIONS

This application is a § 371 of International PCT Application PCT/EP2021/084002, filed Dec. 2, 2021, which claims the benefit of FR2012564, filed Dec. 2, 2020, both of which are herein incorporated by reference in their entireties.

FIELD OF THE INVENTION

The present invention relates to a device for separating air by cryogenic distillation.

BACKGROUND OF THE INVENTION

It is known practice to arrange the different elements of a device for separating air by cryogenic distillation in modules in order to facilitate transportation and installation.

EP629829 describes a modular device for separating air having a framework comprising all of the elements of the device apart from the column, the compressor, and the purification recipients. The framework is placed between the two purification recipients.

EP2657633 provides a module for arranging the connections between the purification unit and the hot end of the heat exchanger.

FR3059087 discloses arranging elements of a device for separating air in elongate enclosures arranged horizontally, the enclosures being stacked on top of each other. In order to allow fluids to communicate from one stack of enclosures to another, an enclosure capping two stacks is provided.

This complex architecture requires subdividing an element of a device for separating air, such as a purification unit, between a plurality of modules.

FR3017939 describes a separation device divided into modules, the modules being arranged in a framework that acts as a support for the modules.

JP-A-2020-69471 and AU2011101525 disclose arranging a valve module below a purification unit comprising two adsorbent beds to reduce the footprint.

SUMMARY OF THE INVENTION

In certain embodiments, the present invention instead aims to arrange each element of the device for separating air in its entirety in a single module, and to use a module to group together a collection of means for transporting fluid between one element and another. This reduces the time taken to connect the elements to each other on site, as the collection of transport means arrives on site ready for connection.

In addition, as the module of fluid transport means is arranged below the module containing the purification unit or vice versa, this makes it possible to reduce the footprint of the device.

This architecture requires an extremely costly framework and the presence of machines that generate vibrations creates a risk of making the use thereof dangerous. As a result, the use of a framework is not envisaged for certain embodiments of the present invention.

An additional aim of the invention is to provide a device for producing impure oxygen by cryogenic distillation.

In certain embodiments, the invention aims to make the transportation and setting up of an air separation device quicker and easier. The device envisaged is also particularly compact and robust.

Positioning the fourth module containing the purification unit in a raised position makes it possible to free space and bring the compressor or compressors closer to the cold part of the device. This reduces the total length of the pipes and thus the pressure drop.

According to one object of the invention, a device for separating air by cryogenic distillation is provided, comprising a first module containing a main air compressor, optionally a second module containing a booster air compressor, a third module, a fourth module containing a purification unit, a fifth module containing a heat exchanger, and a system of columns comprising at least one distillation column optionally contained in the fifth module, the heat exchanger of the fifth module being connected to one column of the system of columns by at least two connections in order to send the air to be separated to it and to the column/one column of the system of columns, and so that at least one fluid separated in the system of columns can be heated therein, the third module being arranged on the ground and acting as a support for the fourth module, characterized in that the third module has a central part corresponding to between two thirds and one fifth of its length, the first and/or the second and/or the fifth module being connected to this central part and preferably located facing this central part.

According to other aspects of the invention:
the third module contains an element that is a heat exchanger, for example for cooling the air coming from the first module destined for the fourth module.
the third module contains an element that is an electrical cabinet.
the third module contains an element that is an instrumentation/monitoring and control cabinet.
the third module contains an element that is an analysis device.
the third module contains an element that is a heat exchanger for heating a residual gas coming from a column and/or from the fifth module destined for the purification unit of the fourth module.
the third module contains an element that is a heat exchanger for cooling the air downstream of a compression stage of an air compressor.
the third module contains an element that is an air cooling heat exchanger connected to a cooling water circuit and optionally to a cooling water pump.
the third module has a central part comprising between one fifth and two thirds of its length.
at least one of the elements in claims 2 to 9 is arranged in the third module but outside the central part.
at least one of the elements in the claims described above is arranged in the third module but outside the central part.
at least a first of the elements in claims 2 to 9 is arranged in the third module but outside the central part at a first end of the third module and at least a second of the elements in claims 2 to 9 is arranged in the third module but outside the central part at a second end of the third module.
the fourth module has a central part comprising between one fifth and two thirds of its length, two adsorbent recipients being arranged on either side of the central part.

the third and/or the fourth modules has the dimensions of a standardized container.

for the third and/or fourth module, the ratio between the length of the module and its width is greater than three.

for the third and/or fourth module, the ratio between the length of the module and its height is greater than three.

The term "arranged on the ground" means that the module arranged on the ground can be arranged on a flat concrete slab placed on the ground and/or raised by metal or concrete pads anchored to the ground and/or on concrete blocks placed directly on the ground or on a concrete slab itself placed on the ground. The module in question can be the first, second, or fifth module. The module in question is the third module.

The first and/or second module is/are preferably located less than 2 m above the ground.

The base of the third module is preferably located less than 2 m above the ground.

The fifth module is by its nature higher than the others but its base can be arranged on the ground. Its base is preferably located less than 2 m above the ground.

According to other optional aspects, which can be combined with each other:

the first and/or second module is arranged facing the third module, which is arranged on the ground.

the base of the fifth module is arranged facing the third module, which is arranged on the ground.

the third and fourth modules form a block the length of which is the length of the third and/or fourth module.

the third and fourth modules are in the form of a right cuboid.

the third and fourth modules are the same length and preferably the same width.

the third module and/or the fourth module is/are arranged with their main axis extending horizontally.

the fifth module is arranged with its main axis extending vertically.

the fifth module comprises a single distillation column or system of distillation columns arranged above the heat exchanger.

the third module is connected to the heat exchanger of the fifth module in order to receive at least one fluid heated in the heat exchanger.

the fourth module has a central part corresponding to between two thirds and one fifth of its length.

the third module has a central part corresponding to between two thirds and one fifth of its length, the first and/or the second and/or the fifth module being connected to this central part and preferably located facing this central part.

the third module is connected to the fourth module in order to transfer fluids through their respective central parts and/or through the top of the third module and the bottom of the fourth module and/or through the bottom of the third module and the top of the fourth module.

the fourth module contains at least two purification recipients for purifying the air, each located on either side of a straight line dividing the length of the fourth module into two parts.

the first module, and optionally the second module and the fifth module, is/are located on either side of the block formed by the third and fourth modules.

the main axis of the first, second or sixth module is perpendicular to the common main axis of the third and fourth modules.

at least one of the first, second, third, fourth and fifth modules comprises a framework, optionally at least partially enclosed.

the third and fourth modules each comprise an at least partially enclosed framework.

the fourth module comprises a framework, optionally at least partially enclosed, containing all of the adsorbent recipients of the device.

the device comprises at least two adsorbent recipients, one recipient arranged at one end of the fourth module and the other at the other end of the fourth module.

the two recipients arranged in the fourth module are located outside the central part thereof.

at least most of the valves of the purification unit are arranged in the central part of the fourth module.

at least most of the valves of the purification unit are arranged between the two recipients of the fourth module.

the central part of the fourth module is located above the central part of the third module.

the third module acts as a support for the fourth module.

for the third and/or fourth module, the ratio between the length of the module and its width is greater than three.

for the third and/or fourth module, the ratio between the length of the module and its height is greater than three.

the fourth module comprises a top, a bottom and four side walls, the connections to the third module passing through the top or the bottom.

the third module comprises a top, a bottom and four side walls, the connection to the first module passing through a side wall.

the third module comprises a top, a bottom and four side walls, the at least two connections to the fifth module passing through a side wall.

the at least two connections from the third module to the fifth module pass through a side wall facing the side wall through which the connection to the second module passes.

the first and/or the second and/or the fifth module is/are arranged on the ground.

The third module can be a parallelepipedal piping module for incorporation into a device for separating air by cryogenic distillation in order to connect an air compressor, a purification unit, and a heat exchanger, comprising a first compressed air coupling in a first wall on the main compressor side capable of being coupled to a fluid pipe coming from the main compressor, two auxiliary couplings in a second wall on the purification unit side perpendicular to the first wall, including a first auxiliary coupling capable of being coupled to a fluid pipe destined for the purification unit and a second auxiliary coupling capable of being coupled to a pipe for fluid purified in the purification unit, and at least one additional coupling in a third wall on the heat exchanger side perpendicular to the second wall and facing the first wall, the additional coupling being capable of being coupled to the heat exchanger, the first coupling being connected to the first auxiliary coupling by means arranged in the module and the second auxiliary coupling being connected to an additional coupling by means arranged in the module, the first, second, and third walls each having a side that is a length of the module, characterized in that it contains:

i) monitoring and/or control and/or instrumentation and/or analysis members and/or ii) a heat exchanger.

According to other optional aspects:

the third module comprises at least two couplings on the heat exchanger side, including one capable of being coupled to a pipe for purified fluid destined for the heat exchanger and at least one capable of being coupled to a pipe for fluid heated in the heat exchanger.

the exchanger comprises n exchange bodies and the third module comprises at least 2n couplings on the heat exchanger side.

the purification unit comprises n adsorbent recipients and at least 2n auxiliary couplings, the auxiliary couplings passing through a wall on the purification unit side, including at least n first auxiliary couplings capable of being coupled to a pipe for fluid to be purified in the purification unit and at least n second auxiliary couplings capable of being coupled to a pipe for fluid purified in the purification unit.

the first wall is facing the third wall and the second wall is perpendicular to the first and third walls.

the first, second and third walls each have two edges formed by the length of the third module.

The device can comprise a single distillation column together with a purification unit that can purify air at low pressure (quasi-atmospheric) or at a pressure at least equal to 4 bar absolute. The device optionally comprises a nitrogen cycle or an air cycle making it possible to provide the energy necessary for distillation.

In order to facilitate transportation, the enclosures used are preferably containers, preferably standardized.

In certain embodiments, the device may include a plurality of modules: a first module contains a main air compressor for compressing all of the air for distillation, a second optional module contains a booster air compressor, a third module contains means making it possible to connect other modules to each other, a fourth module contains an air purification unit for purifying the air for distillation into water and into carbon dioxide and secondary impurities of air, and a fifth module contains a heat exchanger and optionally a distillation column.

A sixth optional module contains a refrigeration unit for cooling the compressed air upstream of the purification unit, directly or via a chilled water circuit.

Preferably, the first module and/or the second module and/or the fifth module is/are arranged on the ground.

The third module can be a simple framework that is not clad with metal sheeting.

It can contain:

piping for venting a residual gas coming from the column, and/or substantially all of the connecting pipes between the first and/or fourth and/or fifth modules, and/or all or some of the monitoring and/or control and/or instrumentation and/or analysis members of the device, and/or a heater for the regeneration gas of the purification unit of the fourth module, and/or a heat exchanger for cooling the air downstream of a compression stage of an air compressor, and/or an air cooling heat exchanger connected to a cooling water circuit.

It preferably does not contain:

any compressors, and/or any adsorbent recipients, and/or any distillation columns, and/or any heat exchangers operating at a cryogenic temperature connected to an air compressor or to a booster air compressor.

BRIEF DESCRIPTION OF THE DRAWINGS

Further features, advantages and possible applications of the invention are apparent from the following description of working and numerical examples and from the drawings. All described and/or depicted features on their own or in any desired combination form the subject matter of the invention, irrespective of the way in which they are combined in the claims or the way in which said claims refer back to one another.

FIG. 1, FIG. 2 and FIG. 3 show devices according to certain embodiments of the invention.

FIG. 1 illustrates a side view of device according to certain embodiments of the invention.

FIG. 2 illustrates a top view of the same device.

FIG. 3 illustrates a cross-section of two modules of certain embodiments of the device along their main axis.

DETAILED DESCRIPTION OF THE INVENTION

As can be seen in FIG. 1, the device comprises six modules preferably arranged on the ground S, with the exception of the fourth module 4. The first module 1 contains a main air compressor (MAC—FIG. 2) for compressing all of the air for distillation. The second module 2 is optional and contains a booster air compressor (BAC—FIG. 2). The fourth module 4 contains an air purification unit (C—FIG. 3) for purifying the air for distillation into water and into carbon dioxide and secondary impurities of air, in particular two adsorbent recipients at the ends of the module separated by piping and regulating valves. The third module 3 contains at least means making it possible to connect other modules to each other. The fifth module contains a heat exchanger (HX—FIG. 2) at least the cold end of which is designed to operate at a temperature below −50° C., or even at a cryogenic temperature, and a distillation column (COL—FIG. 2). The sixth module 6, which is optional, contains a refrigeration unit (60—FIG. 2) for cooling the compressed air upstream of the purification unit, directly or via a chilled water circuit.

The third module 3 and the fourth module 4 are arranged one on top of the other with the fourth module above the third module, so that the third module supports the fourth module and is arranged on the ground S.

The third and fourth modules are preferably the same length and the same width, so that the two modules 3, 4 form a block that is the same length as each module 3, 4 and the same width as each module 3, 4. The modules 3, 4 are not necessarily identical in height.

Each of the third and fourth modules comprises an enclosure in the form of a right rectangular prism, or even a right square prism. At least one of the third and fourth modules can be a standardized container. Otherwise, the framework of the third and/or of the fourth module can have the dimensions of a standardized container and be provided with standardized handling systems in the corners, for example standardized corners, for example in accordance with ISO 668. Otherwise, the framework of the third and/or of the fourth module can have dimensions that allow it to fit into a standardized container.

Preferably for the third and/or fourth module, the ratio between the length of the module and its width is greater than three and the ratio between the length of the module and its height is greater than three.

The third and fourth modules 3, 4 are arranged with their length extending horizontally and are in the form of a right cuboid.

The fourth module 4 comprises one or more enclosures containing a purification unit and preferably does not comprise a compressor.

The fourth module 4 is connected to the first module 1 through the third module, the means for transporting the air from the compressor of the first module to the purification unit passing through the third module 3 before arriving at the purification unit.

The fourth module 4 is also connected to the heat exchanger of the fifth module 5, the means for transporting the air purified in the purification unit of the fourth module passing through the third module 3 before arriving at the heat exchanger of the fifth module.

The fifth module 5 comprises an enclosure in the form of a right rectangular prism, or even a right square prism. The enclosure is preferably a standardized container or an identical size to a standardized container, and is provided with standardized handling systems in the corners. Alternatively, the fifth module comprises a cylindrical enclosure.

The fifth module 5 is arranged with its length extending vertically. It contains a distillation column preferably arranged above the heat exchanger. The hot end of the heat exchanger is preferably positioned low down. The distillation column produces at least one fluid rich in a component of air that is heated in the exchanger and is then sent to the third module 3 to be sent into the atmosphere or to a client from this third module 3.

The base of the fifth module is facing the third module in order to facilitate this transfer.

The fifth module 5 can contain an air expansion turbine for supplying cold energy of the method but other means for keeping cold can be envisaged, for example liquid nitrogen feeding. It can also comprise at least one heat exchanger for supercooling the air destined for the column or a liquid coming from the distillation system. The fifth module will be insulated in order to allow the elements that it contains to operate at below-ambient or even cryogenic temperatures, preferably by means of vacuum insulation.

The air compressed in the first module can optionally be sent to a refrigeration unit in a sixth module 6, the air passing from the first to the sixth module through the third module 3.

As a result, it is recommended that the first module 1 be arranged facing the sixth module 6 in order to make the device more compact.

Alternatively, chilled water can be sent from a refrigeration unit in a sixth module 6 to the third module 3 in order to cool the air in an exchanger.

The air cooled directly or indirectly by the refrigeration unit is then sent to the fourth module, passing through the third module.

The device can optionally comprise a booster compressor in a second module 2.

The air compressed in the first module and purified in the fourth module can be sent to a booster compressor in the second module 2, the purified air passing from the fourth to the second module through the third module 3.

The air compressed in the second module is then sent to the fifth module 5 to be cooled, passing through the third module 3.

It will be easily understood that there can be a plurality of second modules containing booster compressors, or the second module can contain a plurality of booster compressors.

As all of the fluids passing through the third module are at least at ambient temperature, it is not necessary to insulate the third module 3 by filling the module with loose-fill insulation. However, it is desirable to insulate certain elements of the third module 3 by cladding them with insulation. For example, the air cooled by the refrigeration unit of the module 6 must circulate in a pipe clad with a layer of insulation in order to limit heating. Likewise, the heater of the third module is insulated in order to protect personnel and limit heat losses.

The third module 3 does not contain a distillation column and preferably does not contain any compressors. It can contain:
  A heat exchanger, for example for cooling the air coming from the first module destined for the fourth module, and/or
  An electrical cabinet, and/or
  An instrumentation/monitoring and control cabinet, and/or
  An analysis device, and/or
  A heat exchanger for heating a residual gas coming from a column and/or from the fifth module destined for the purification unit of the fourth module, and/or
  A heat exchanger for cooling the air downstream of a compression stage of an air compressor, and/or
  An air cooling heat exchanger connected to a cooling water circuit.

The third module preferably does not contain any elements operating at cryogenic temperatures, or even at temperatures below 0° C.

A residual gas produced by distillation must be sent to the purification unit for the regeneration of the purification unit. This flow will be heated, preferably in the heat exchanger of the third module, and sent to the fourth module where it can be heated again by a dedicated heat exchanger present in the fourth module.

The walls of the third and/or of the fourth module 3, 4 can be clad with metal sheets or otherwise can be virtual walls.

The connections between the third and fourth modules 3, 4 pass through the roof or top or the base or bottom of the third module (here the roof or top, as the third module is below the fourth module). These connections are thus made inside the common block formed by the two modules.

The connections to the first module and to the fifth module will be made in side walls of the third module.

The fourth module 4 is a framework, which can be enclosed by metal sheeting, containing at least one, or even at least two purification recipients, for example a cylinder. One recipient is preferably arranged at one end of the fourth module and another at the other end of the fourth module. Between the two recipients are the pipes connecting the recipients to each other, to the air inlet and to the purified air outlet, and to the regeneration gas.

The fourth module 4 does not contain a distillation column and preferably does not contain any compressors.

The third and fourth modules each comprise a top or roof, a bottom or base and four side walls. For the fourth module, the connection to the third module passes through the roof or top of the third module and the base or bottom of the fourth module. If the framework is not clad with metal sheets, the walls, roof and base are represented by the sides of the framework.

For the third module comprising a roof, a base and four side walls, the at least two connections to the fifth module pass through a side wall.

The at least two connections from the third module to the fifth module 5 pass through a side wall facing the side wall through which the connection to the second module 2 passes.

The first module 1 is arranged beside the stacked third and fourth modules 3, 4. A second module 2 can also be arranged on the same side of the stacked modules 3, 4 as the first module 1.

The fifth module 5 is preferably located on the other side of the stacked third and fourth modules 3, 4 from the first and optionally second modules 1, 2.

The sixth module 6, if present, is preferably arranged on the same side as the fifth module 5.

The device can comprise at least one distillation column outside the fifth module 5 and the fifth module 5 can contain no distillation columns.

The main axis of the first, second or sixth module 1, 2, 6 is perpendicular to the common main axis of the third and fourth modules 3, 4.

At least one of the first, second, third, fourth and fifth modules 1, 2, 3, 4, 5 comprises a framework, optionally at least partially enclosed.

The third and fourth modules can be placed or fastened on the third module in order to form an element for transporting, and this element has the dimensions of a standardized container or can fit inside a standardized container.

Each of the modules can be mounted on a skid to facilitate the transportation thereof. The height of a module does not exceed 3 m, or even 2 m, for this reason.

The third module 3 is a piping module for the device for separating air by cryogenic distillation, making it possible to connect an air compressor 1, 2, a purification unit 4, and a heat exchanger 5.

The compressor 1, the purification unit 4 and the heat exchanger 5 are connected to each other and the exchanger is connected to a system of columns for separating air.

It comprises a first compressed air coupling in a first wall on the main compressor side capable of being coupled to a fluid pipe coming from the main compressor, two auxiliary couplings in a second wall on the purification unit side, including a first auxiliary coupling capable of being coupled to a fluid pipe destined for the purification unit and a second auxiliary coupling capable of being coupled to a pipe for fluid purified in the purification unit, and at least one additional coupling in a third wall on the heat exchanger side capable of being coupled to the heat exchanger 5. The first coupling is connected to the first auxiliary coupling by means arranged in the module and the second auxiliary coupling is connected to an additional coupling by means arranged in the module. The compressor, the heat exchanger and the purification unit are thus grouped around the module 3. One of the three elements can be arranged on the third module 3 with the other two placed on the ground like the third module.

The module 3 comprises at least two couplings on the heat exchanger side, including one capable of being coupled to a pipe for purified fluid destined for the heat exchanger and at least one capable of being coupled to a pipe for fluid heated in the heat exchanger.

Preferably, the first wall is facing the third wall and the second wall is perpendicular to the first and third walls. The second wall can form a roof of the module 3 or an end of the module 3.

If the exchanger comprises n exchange bodies, the module comprises at least 2n couplings on the heat exchanger side.

If the purification unit comprises n adsorbent recipients and at least 2n auxiliary couplings in a second wall on the purification unit side, including at least n first auxiliary couplings capable of being coupled to a fluid pipe destined for the purification unit and at least n second auxiliary couplings capable of being coupled to a pipe for fluid purified in the purification unit.

The first, second and third walls each have two edges formed by the length of the module 3.

In this example, the first, second, third, fifth, and sixth modules are arranged on the ground. As explained above, it is possible that at least one of these modules be arranged on intermediate means placed on the ground for reasons of stability and to facilitate the civil engineering.

The first and optionally the second module cannot be located at a level above the highest of the third and fourth modules as one aim of the invention is to reduce the length of the connections and/or to reduce the footprint of the device as a whole.

The invention aims to reduce the distance between the first module and the block formed by the third and fourth modules and/or the distance between the fifth module and the block formed by the third and fourth modules.

In the example, the fourth module is arranged on the ground and acts as a support for the third module, but as a variant the third module is arranged on the ground and acts as a support for the fourth module.

As each of the first and fifth modules must be connected to the third module, the decision to position the fourth module on the ground or on the third module itself positioned on the ground depends on the dimensions of the first (or fifth) module. For example, if the first module is relatively low, it will be connected to the fourth module placed on the ground, and if the first module is relatively high, it will be connected to the fourth module placed on the third module, itself arranged on the ground.

FIG. 3 illustrates the arrangement of the elements in the third and fourth modules. The fourth module 4 placed on the third module comprises two adsorbent recipients C placed on either side of a central part T occupied by the piping and the regulating valves of the purification unit. At least some, preferably at least most, of the valves of the purification unit are arranged in the central part of the fourth module. At least most of the valves of the purification unit are arranged between the two recipients of the fourth module. The central part T of the fourth module 4 is located above the central part W of the third module in order to facilitate the connections between the compressor and the heat exchanger of the cold box and reduce the pressure drops.

This piping and these valves are connected to the recipients C and, through the base of the fourth module and the roof of the third, pass through the third module to the first and fifth modules, for example. The connecting piping is located in the central part W of the third module 3. At one end of the third module is at least one element X, which can be:

A heat exchanger, for example for cooling the air coming from the first module destined for the fourth module, and/or An electrical cabinet, and/or An instrumentation/monitoring and control cabinet, and/or An analysis device, and/or A heat exchanger for heating a residual gas coming from a column and/or from the fifth module destined for the purification unit of the fourth module, and/or A heat exchanger for cooling the air downstream of a compression stage of an air compressor, and/or An air cooling heat exchanger connected to a cooling water circuit.

At the other end of the third module is at least one element Y

A heat exchanger, for example for cooling the air coming from the first module destined for the fourth module, and/or An electrical cabinet, and/or An instrumentation/monitoring and control cabinet, and/or An analysis device, and/or A heat exchanger for heating a residual gas coming from a column and/or from the fifth module destined for the purification unit of the fourth module, and/or A heat exchanger for cooling the air downstream of a compression stage of an air compressor, and/or An air cooling heat exchanger connected to a cooling water circuit, and/or A cooling water pump of the cooling water circuit.

Although it is possible to duplicate a particular element, the element(s) X at one end will not be the same as the element(s) Y at the other end.

For example, an air cooling heat exchanger connected to a cooling water circuit can be arranged at one end, perhaps with at least one water pump, and an element other than an air cooling heat exchanger connected to a cooling water circuit can be arranged at the other end, for example a heat exchanger for heating a residual gas coming from a column and/or from the fifth module, destined for the purification unit of the fourth module.

The proposed modules thus make it possible to arrange a large number of elements connected to the purification unit while reducing the footprint. Access for users is facilitated, as the elements that must be easy to access are at ground level.

For the third and/or fourth modules 3, 4, the ratio between the length of the module and its width is greater than three, and/or the ratio between the length of the module and its height is greater than three.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A device for separating air by cryogenic distillation, the device comprising:
    a first module configured to contain a main air compressor,
    a third module having a total length,
    a fourth module containing a purification unit,
    a fifth module configured to contain a heat exchanger, and
    a system of columns comprising at least one distillation column,
    wherein the fifth module is connected to said at least one distillation column of the system of columns by at least two fluid connections such that the device is configured to send the air to be separated to the heat exchanger and to the at least one distillation column of the system of columns, and to allow at least one fluid separated in the system of columns to be heated within the heat exchanger,
    wherein the third module is a horizontally oriented structural module arranged on the ground and configured to provide direct structural support from an upper surface of the third module to a lower surface of the fourth module, such that the fourth module is positioned directly on top of and supported by the upper surface of the third module,
    wherein the third module defines a central piping connection zone along the total length of the third module, said central piping connection zone having a length corresponding to between one-fifth and two-thirds of the total length of the third module, said central piping connection zone being distinct from end portions of the third module,
    wherein the first module is fluidically connected via piping to interfaces located within said central piping connection zone of the third module to supply compressed air to the interfaces,
    wherein the fifth module is fluidically connected via piping through a sidewall of the third module to interfaces located within said central piping connection zone of the third module to exchange process fluids therewith, and wherein said at least one of the first module and the fifth module so connected is located facing said central piping connection zone of the third module, and,
    wherein at least one of said end portions of the third module, located outside said central piping connection zone, houses at least one non-cryogenic operational component selected from the group consisting of: an electrical cabinet, an instrumentation cabinet, a control cabinet, an analysis device, a regeneration gas heater, and combinations thereof.

2. The device as claimed in claim 1, wherein the third module contains an element that is a heat exchanger that is configured to cool the air coming from the first module destined for the fourth module.

3. The device as claimed in claim 1, wherein the third module contains an element that is an electrical cabinet.

4. The device as claimed in claim 1, wherein the third module contains an element that is an instrumentation/monitoring and control cabinet.

5. The device as claimed in claim 1, wherein the third module contains an element that is an analysis device.

6. The device as claimed in claim 1, wherein the third module contains an element that is a heat exchanger for heating a residual gas coming from a column and/or from the fifth module destined for the purification unit of the fourth module.

7. The device as claimed in claim 1, wherein the third module contains an element that is a heat exchanger for cooling the air downstream of a compression stage of an air compressor.

8. The device as claimed in claim 1, wherein the third module contains an element that is an air cooling heat exchanger connected to a cooling water circuit and optionally to a cooling water pump.

9. The device as claimed in claim 1, wherein the length of the central piping connection zone is between one fifth and two thirds of the total length of the third module.

10. The device as claimed in claim 9, wherein an element selected from the group consisting of a first heat exchanger configured to cool air from the first module, an electrical cabinet, analysis device, a second heat exchanger configured to heat a residual gas coming from a column and/or from the fifth module, a third heat exchanger configured to cool air downstream of a compression stage of an air compressor, an air cooling heat exchanger connected to a cooling water circuit, and combinations thereof, is arranged in the third module but outside the central part.

11. The device as claimed in claim 9, wherein an element, which is selected from the group consisting of a first heat exchanger configured to cool air from the first module, an electrical cabinet, analysis device, a second heat exchanger configured to heat a residual gas coming from a column and/or from the fifth module, a third heat exchanger configured to cool air downstream of a compression stage of an air compressor, an air cooling heat exchanger connected to a cooling water circuit, and combinations thereof, is arranged in the third module but outside the central part at a first end of the third module and at least a second element, which is selected from the group consisting of the first heat exchanger configured to cool air from the first module, an electrical cabinet, analysis device, the second heat exchanger configured to heat the residual gas coming from the column and/or from the fifth module, the third heat exchanger configured to cool air downstream of the compression stage of an air compressor, an air cooling heat exchanger connected to the cooling water circuit, and combinations thereof, is arranged in the third module but outside the central part at the second end of the third module.

12. The device as claimed in claim 1, wherein the fourth module has a central part comprising between one fifth and two thirds of a total length of the fourth module, two adsorbent recipients being arranged on either side of the central part.

13. The device as claimed in claim 1, wherein the third and/or the fourth module has the dimensions of a standardized container in accordance with ISO 668 standards.

14. The device as claimed in claim 1, wherein for the third and/or fourth module, the ratio between the length of the module and its width is greater than three.

15. The device as claimed in claim 1, wherein for the third and/or fourth module, the ratio between the length of the module and its height is greater than three.

16. The device as claimed in claim 1, further comprising a second module containing a booster air compressor.

17. The device as claimed in claim 1, wherein the third module does not provide load-bearing support for any modules other than the fourth module.

18. The device as claimed in claim 1, wherein the third module has an inner volume in which both the central piping zone and the at least one non-cryogenic operational component are disposed.

19. A device for separating air by cryogenic distillation, the device comprising:
a first module configured to contain a main air compressor;
a third module having a total length;
a fourth module containing a purification unit wherein the purification unit comprises a first adsorbent container and a second adsorbent container;
a fifth module configured to contain a heat exchanger; and
a system of columns comprising at least one distillation column,
wherein the third module comprises fluid transport means that are configured to fluidly connect the other modules together,
wherein the fifth module is connected to said at least one distillation column of the system of columns by at least two fluid connections such that the device is configured to send the air to be separated to the heat exchanger and to the at least one distillation column of the system of columns, and to allow at least one fluid separated in the system of columns to be heated within the heat exchanger,
wherein the third module is arranged on the ground and provides structural support for the fourth module,
wherein the third module has a central part corresponding to between two thirds and one fifth of its length,
wherein the first and the fifth module is connected to this central part and located facing this central part,
wherein the first adsorbent container is disposed at a first horizontal end of the fourth module and the second adsorbent container is disposed at a second horizontal end of the fourth module, such that the first adsorbent container and the second adsorbent container are located outside a central section of the fourth module,
wherein a majority of valves of the purification unit are disposed in the central section of the fourth module between the first and second adsorbent containers,
wherein the central section of the fourth module is located above the central part of the third module,
wherein the fifth module is fluidically connected via piping through a sidewall of the third module to interfaces located within said central piping connection zone of the third module to exchange process fluids therewith.

* * * * *